United States Patent [19]

Fraynd et al.

[11] Patent Number: 5,522,121
[45] Date of Patent: Jun. 4, 1996

[54] COUPLER TO JOIN TWO STROLLERS

[76] Inventors: Saul Fraynd; Sara L. Fraynd, both of 3801 NE 207th St. #33, Miami, Fla. 33180

[21] Appl. No.: 271,203

[22] Filed: Sep. 19, 1994

[51] Int. Cl.⁶ .............................. A44B 21/00; B62B 9/00
[52] U.S. Cl. ............................. 24/335; 24/339; 280/658
[58] Field of Search .......................... 24/335, 339, 341, 24/115 G, 20 R, 908, 905, 284, 286; 280/47.35, 658

[56] References Cited

U.S. PATENT DOCUMENTS

| 461,069 | 10/1891 | Caspar | 24/335 |
| 1,318,850 | 10/1919 | Yong | 24/339 |
| 1,352,647 | 9/1920 | Benton | 24/335 |
| 1,688,148 | 10/1928 | Martin | 24/339 |
| 1,707,186 | 3/1929 | Chatfield | 280/658 |
| 4,805,938 | 2/1989 | Redmond et al. | 24/339 |

FOREIGN PATENT DOCUMENTS

| 2644745 | 9/1990 | France | 280/658 |
| 0399781 | 3/1966 | Switzerland | 24/335 |

*Primary Examiner*—Victor N. Sakran
*Attorney, Agent, or Firm*—Robert C. Kain, Jr.

[57] ABSTRACT

A device is provided for engaging and disengaging any two baby strolling devices consisting of two components spaced apart and coupled by a snap release connector. When mounted between the frames of any two baby strolling devices (given that it can rotate at any angle), Instandem allows any one person to operate the two strolling devices simultaneously as well as disengaging them as needed.

1 Claim, 2 Drawing Sheets

COUPLER TO JOIN TWO STROLLERS

BACKGROUND OF THE INVENTION

1. Field of the Invention

The present Invention relates to connectors and more specifically it relates to a device for engaging and disengaging two baby strollers as required.

2. Prior Art

Numerous connectors have been provided in prior art that are adapted to attach, join, fasten, couple, engage, link, unite articles together or connecting two baby strollers together such as the "DEVICE FOR CONNECTING TWO BABY STROLLERS TOGETHER" of Thomas and Regina Redmond U.S. Pat. No. 4,805,938.

While these units may be suitable for the particular purpose to which they address, they would not be suitable for the purposes of the present invention as heretofore described.

SUMMARY OF THE INVENTION

The primary object of the present invention is to provide a device for engaging any two baby strolling devices: a baby stroller, umbrella or carriage. This device will overcome the shortcomings of any prior art devices.

It also is an object of the present invention to provide such a device which is of simple, inexpensive construction.

Another object is to provide a device for engaging two baby strolling devices so that one person can operate them simultaneously.

Another object is to provide a device that disengages quickly, without the use of any tools, be it for transportation, for storage in the trunk of an automobile or passing through a narrow entrance.

Another object is to provide a device that can be installed in any number of brands and styles available in the market; this is due to its circular design which allows it to rotate to any angle, as required.

It will be understood that each of the elements used in the composition of Instandem, or two or more together, may also find useful applications in other types of methods differing from the one at hand.

Certain novel features of this invention have been shown and described and are pointed out in the annexed claims; it is not intended to be limited to the details above, since it will be understood that various omissions, modifications, substitutions and changes in forms and details of the device illustrated and its operation can be made by those skilled in the art without departing in any way from the spirit of the present invention.

DETAILED DESCRIPTION

Figure 3:
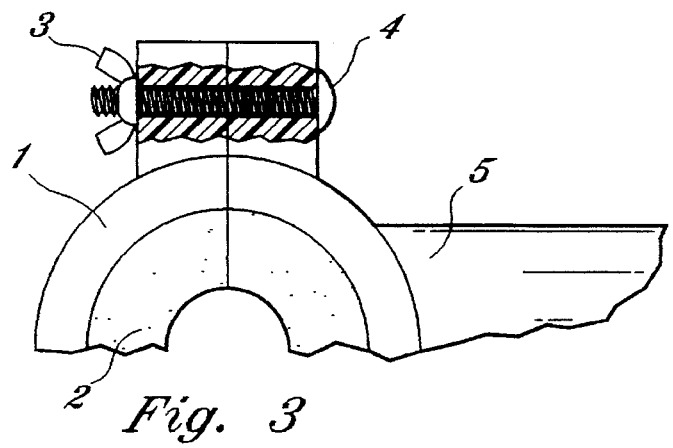
FIG. 3 Detailed views of the clamps and securing/mounting section of the device.

As shown in the drawings, the Instandem device in accordance with the present invention is made up of two semi-circular clamps (1), which preferably are of strong molded plastic material, in each of its two components. Notice in FIG. 3 that the clamps are semi-circular in shape and are lined in their interior wall by a dense sponge (2) in the same shape. The semi-circular shape of these parts is so the device may be flexible enough to fit any of a number of different types of frames (10 and/or 11) used in the making of strolling devices for infants and/or toddlers. The clamps are mounted by pairing them along their mating edges and secured by a bolt (4) extending on either side of the particular unit; a wing nut (3) is threaded onto the distal end of the bolt (4), allowing for convenient tightening which may be occasionally required.

Figure 5:
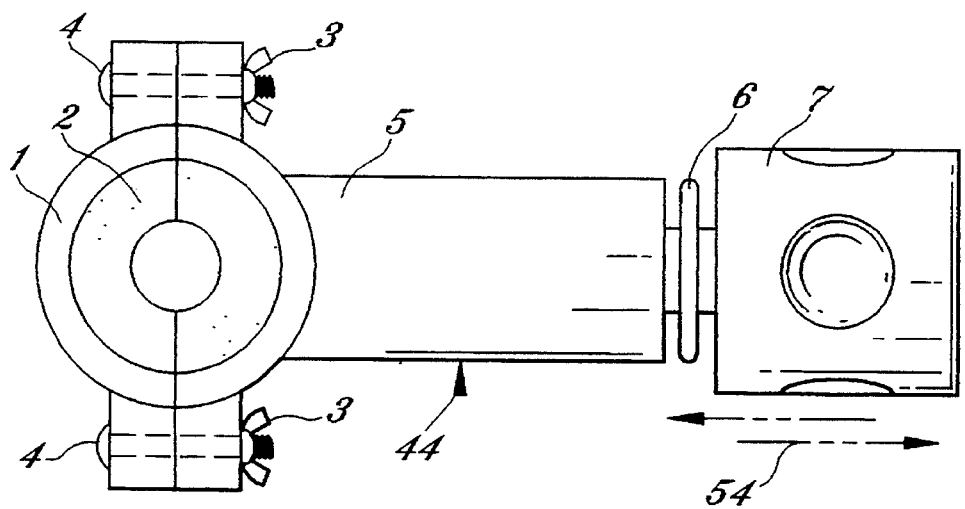
FIG. 5 View of the female component of the device.
Figure 6:
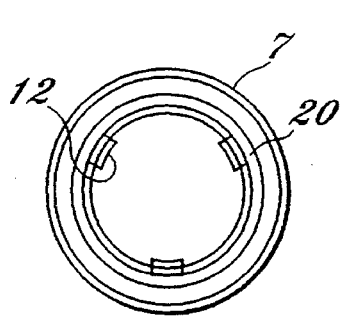
FIG. 6 Top view of the snap release connector.
Figure 7:
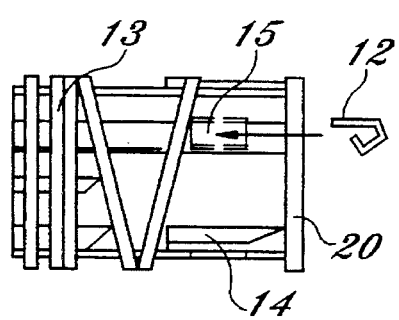
FIG. 7 Detailed view of the snap release connector mechanism.

FIG. 5 relates to the female end portion of the device which snugly couples with the male portion (8) of the device. The female section of Instandem allows for a snap release action of the parts by pulling on the connector cover (7). A disc (6), made of strong molded plastic, serves as stopper for the front to back snapping motion of the connector cover. Pulling on the connector cover generates a release in the connecting teeth (12), which can best be seen on FIG. 7. The teeth, preferably made of strong molded plastic, are located in cutouts (15) at the tip of each of three channels (14) located inside the connector. The release in the teeth creates a separation in the two components of the device; the spring (13) located inside of the connector, allows for the repositioning of the teeth and therefore, reposition of the connector of the device.

Figure 8:
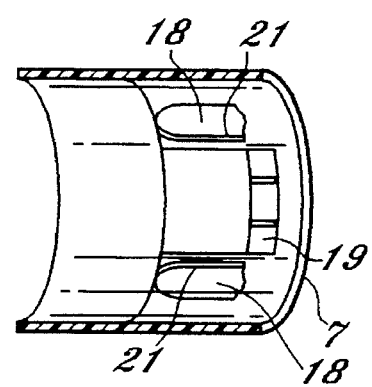
FIG. 8 Detailed view of the inside of the snap release connector cover.

In FIG. 8, we see the parts which allow the teeth (12) to lock in place. These tooth locking parts (18) are located on the inside of the conector cover (7) together with nine connector cover holders (19), which hold the snap release connector cover in its proper position. These connector cover holders rest onto a molded plastic trim (20) which is serves also as a stopper for the snap release connector cover; the grooves or channels (21) in the connector cover serve as guides for the tooth cutouts guides(15). The mechanism within the snap release connector provides for a calculated movement of the parts hence, making it a safe connector for the use detailed herein.

Figure 4:
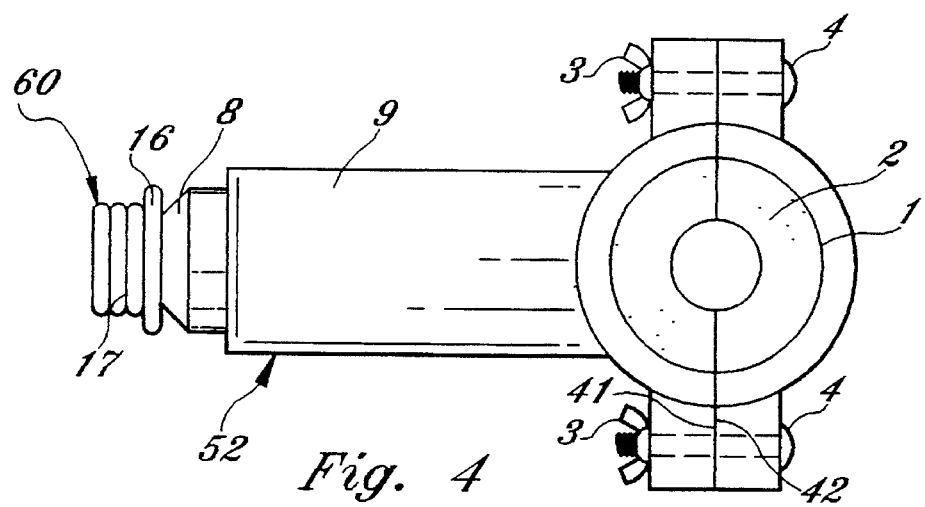
FIG. 4 View of the male component of the device.

The male component (FIG. 4) of the device projects into the female component (FIG. 5) at which time, the teeth (12) located within the female component, are engaged onto the top ring (16) of the male extrusion coupling both sections of the unit.

Figure 1:
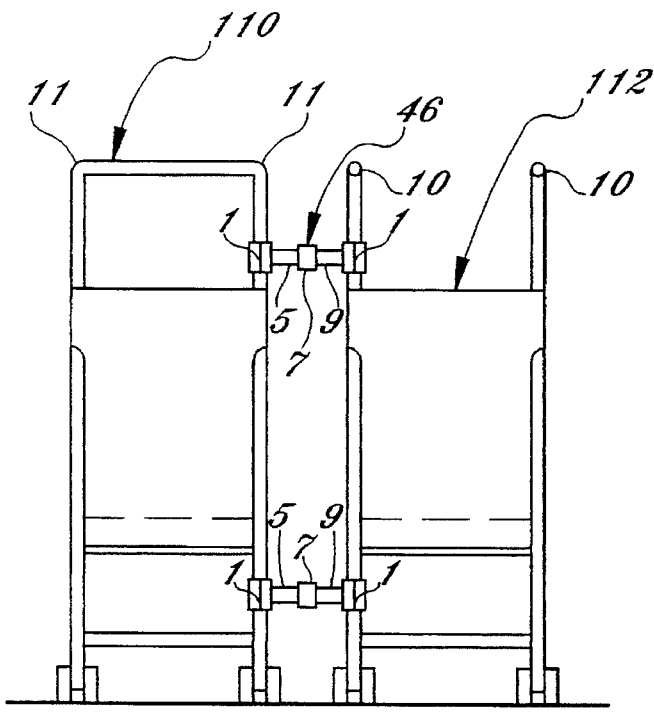
FIG. 1 Two strolling devices coupled by means of Instandem.
Figure 2:
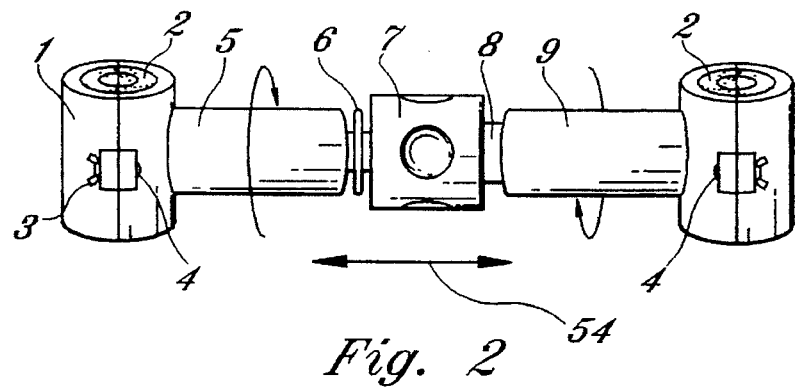
FIG. 2 General view of Instandem.

In FIG. 1 we see Instandem mounted onto the frames (10 and/or 11) of any given two baby strolling devices so that one person (not shown) can operate the two baby strolling devices simultaneously and yet, as the descriptions herein, allows that person the flexibility for an easy separation of the two as needed.

FIG. 1 also illustrates the length of the device which allows for a perfect rotation of the wheels of the strolling devices which makes them as easy to handle as if it was just one unit.

We claim:

1. A coupler to removably attach two baby strollers together, each stroller having a pair of side supporting frame members, said coupler comprising:

a first and a second elongated coupling element, each coupling element having a stroller frame attachment clamp which is removably attached to the frame members of one or the other of said strollers, corresponding frame attachment clamps being disposed on opposing ends of said first and second coupling elements when said first and second coupling elements are joined together;

said first coupling element having a female coupler unit at an end opposite said respective stroller frame attachment clamp;

said second coupling element having a male coupler unit at an end opposite said respective stroller frame attachment clamp;

said male coupler unit defining at least one annular ring about a terminal end of said male coupler unit;

said female coupler unit including:
- a generally cylindrical receptacle sized to receive said terminal end of said male coupler unit,
- a translating cover piece movably disposed over the female receptacle,
- a spring biasing said translating cover in one direction,
- a plurality of spring loaded teeth movably disposed in a corresponding plurality of radially defined cavities in said translating cover piece and said female receptacle, said spring loaded teeth being biased radially inward within said radial cavity via said spring and protruding radially inward beyond an inside face of said translating cover and said female receptacle, said translating cover compressing said spring and removing said radial bias when said cover is translated across said teeth, and each tooth of said plurality of teeth having a radially inward projection thereon which mates with said annular ring on said male coupler unit such that when said teeth are biased radially inward said annular ring of said terminal end of said male coupler unit is locked within said cylindrical female receptacle, and when said translating cover moves across said teeth, said radial bias is removed and said annular ring radially moves said teeth outward thereby releasing said male coupler unit from said female coupler unit.

\* \* \* \* \*